Jan. 20, 1953     J. KIRWIN     2,625,863

TESTING DEVICE FOR FLASH CAMERAS

Filed Jan. 17, 1950

Inventor
John Kirwin
By J. Irving Silverman
Attorney

Patented Jan. 20, 1953

2,625,863

UNITED STATES PATENT OFFICE 2,625,863

TESTING DEVICE FOR FLASH CAMERAS

John Kirwin, Crystal Lake, Ill.

Application January 17, 1950, Serial No. 139,063

3 Claims. (Cl. 95—11.5)

This invention relates to a camera testing device and more particularly to a device for use in conjunction with flash cameras.

The type of camera with which this invention is concerned has associated therewith an electrical circuit whose purpose it is to ignite a flash bulb of the well-known type at approximately the same time that the shutter is momentarily opened. The great aura of intense light thereby produced will serve to expose the uncovered film so that photographs may be obtained either of speedily moving objects, or under adverse lighting conditions, or in some instances in both circumstances.

Heretofore, cameras of this type have had no testing devices associated therewith which accomplished the purposes of my new apparatus. Thus, in cases where the shutter mechanically operated the electrical switch, there was no way of knowing whether the switch was making contact or was stuck in open or closed condition. There was no way of knowing whether the batteries had sufficient strength to ignite the flash bulb. There was no way of knowing whether the flash bulb was making proper contact in its socket, or whether the flash bulb was defective. These difficulties gave rise to many disadvantages, among which were: failure to expose film when the shutter was opened; failure of the bulb to flash; premature flash of the bulb; spoilage of film; and in some cases finger burns of the operator.

The primary object of this invention is to correct all of the above faults and render the operation of the flash camera fool-proof and safe.

Another object of this invention is to provide means for testing the circuit of this type of camera which is inexpensive and is easily and readily operated.

Still a further object of this invention is to provide means for testing the circuit and shutter of this type of camera which may be mounted and assembled on practically any type flash camera.

Still a further object of my invention is to provide means on a camera of this type which adds safety to the use of flashbulbs therewith.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings.

Figure 1:
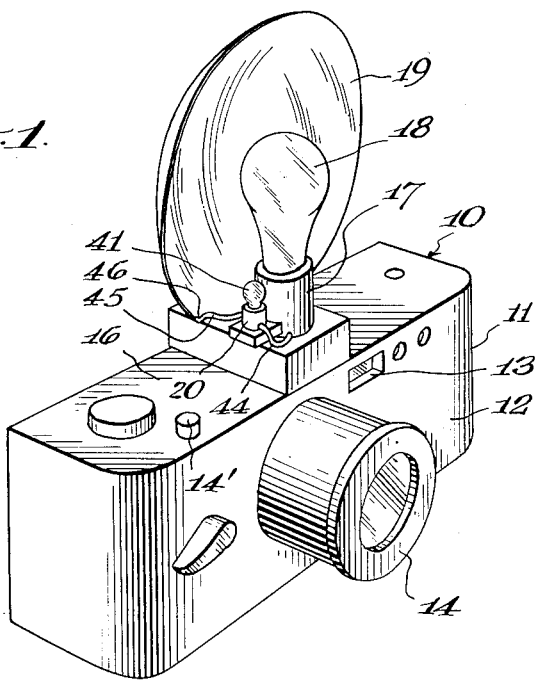
Fig. 1 is a perspective view of a flashbulb camera showing my testing device mounted on the camera.

Referring now to the figures, the reference character 10 designates generally a camera of the flashbulb type and comprising a camera body 11, a front wall 12 which may have a viewing screen 13 associated therewith. Protruding from said front wall 12 is lens housing 14 having a conventional type camera lens mounted therein, and associated with said lens is a shutter release 14' for snapping the shutter of the camera pursuant to taking pictures therewith. Mounted on the top wall 16 of the camera 10 is a socket 17 for retaining the flash bulb 18 therein and immediately behind the flashbulb 18 on the top wall 16 is mounted a reflector 19 used in conjunction with the flashbulb 18 for reflecting the light emanating therefrom. Positioned beside the flashbulb 18 and connected to the circuit thereof by means of lead 44 is a lamp 41 mounted in the socket 20 on the top wall 11 which comprises the indicating means of my testing device.

Figure 2:
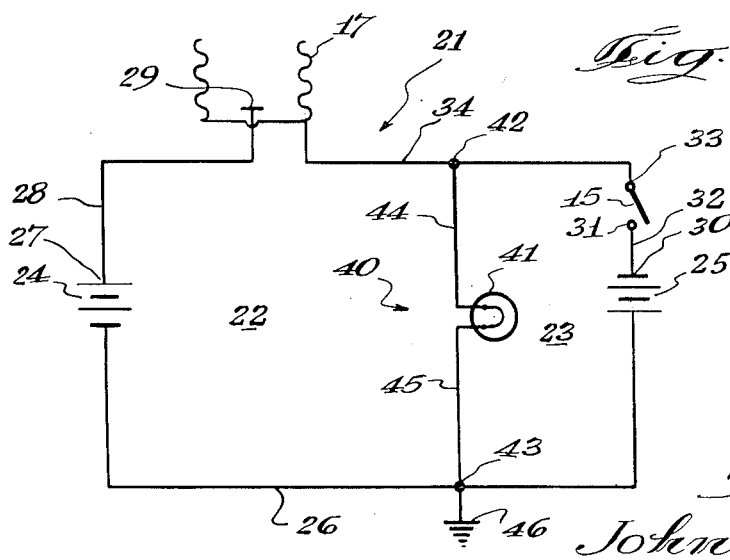
Fig. 2 is a circuit diagram showing the manner of associating my testing device with the electrical circuit of a flashbulb camera.

Referring now to Fig. 2, the reference character 21 designates generally a flashbulb circuit associated with the camera 10 which is comprised of two parallel branches 22 and 23 respectively. Considering the circuit 21 without the lamp 41 connected therein, the circuit comprises a pair of low voltage cells 24 and 25 connected in series with each other by lead 26. Cell 24 is connected at its terminal 27 by lead 28 to the metal contact 29 located in the socket 17. Battery 25 is connected at its terminal 30 to one post 31 of the shutter switch 15 by lead 32 and the second post 33 of the switch 15 is connected by lead 34 to the socket 17 into which the flashbulb 18 is secured, thereby completing the flashbulb circuit 21.

Considering the circuit 40 with the lamp 41 connected therein, the lamp 41 will be seen to be attached across the leads 34 and 26 as at 42 and 43 respectively by means of leads 44 and 45, the lamp 41 being grounded at 46. Connecting the lamp 41 in this manner forms the circuit 21 into the two parallel branches 22 and 23 respectively. The lamp 41 is a low voltage lamp of considerably higher resistance than the flashbulb 18.

Let us consider circuit 21 without the flashbulb 18 screwed into the socket 17 so as to make contact with the metal contact 29. The circuit will be open so that no electricity flows in the branch 22 whereby the lamp 41 will remain extinguished. Now, if the switch 15 is closed, current will flow from battery 25 through the lamp 41 to ignite same. When the switch 15 is open the lamp 41 is extinguished indicating that the shutter or shutter switch is not stuck, and the user can screw in the flashbulb 18 without fear of it flashing prematurely. While the lamp is lit the operator knows not to mount the flashbulb 18 until any difficulties have been remedied.

If during testing the circuit 23 by closing and opening the shutter switch and the lamp 41 does not light at all, the user knows that the batteries are weak and unable to supply enough current to ignite even the lamp 41 and certainly not the flashbulb. In this case the user has an opportunity to change batteries without any spoilage of film.

Supposing that the lamp 41 has been ignited by the operation above and the user is prepared to insert the flashbulb. With the lamp 41 extinguished the flashbulb 18 may be inserted into the socket 17 without fear of a premature flash resulting in burns to the user's fingers. When the flashbulb 18 is inserted, the branch 22 of the circuit 21 is completed permitting a flow of current from the battery 24. Since the lamp 41 forms a relatively high resistance as compared to the flashbulb 18, most of the voltage will appear across the flashbulb 18 and the current will not be sufficient to ignite the flashbulb while at the same time the lamp 41 is ignited. Of course, at this stage of the operation switch 15 is open. Should the lamp 41 remain extinguished after mounting the flashbulb 18, the operator knows that the flashbulb is defective or not making good contact. With flashbulb 18 mounted in the socket 17 and the lamp 41 ignited, the user knows that the circuit is intact and that upon closing the switch 15 the flashbulb in turn will be ignited.

After testing the circuit in the manner described, the user is prepared to take a picture with the camera. When the switch 15 is closed with the resulting opening of the shutter proper, the flashbulb circuit is closed. Current will flow in the circuit 21 from the two cells 24 and 25. Since lamp 41 is of relatively high resistance compared with the flashbulb 18, only a small amount of current, if any, will flow through the said lamp 41 while most of the current will be caused to flow through the flashbulb 18 thereby igniting the same. As a matter of fact, the currents flowing in branch 40 will tend to buck one another, so that in effect branch 40 serves as a very high resistance and may be considered as not in the circuit. Under these circumstances the current flow through lamp 18 will be limited only by the low resistance of the lamp 18.

Although I have shown a preferred embodiment of my device in Fig. 2 in which the cells 24 and 25 are connected directly to each other by lead 26 and switch 15 is connected between the socket 17 and battery 25, switch 15 and battery 25 may be interchanged without rendering my device inoperable. It is also apparent that my device is operable in those cameras of the flashbulb type where the flashbulb is not mounted directly in a socket as socket 17 on the top wall 16 of the camera 10, but which is instead held at a distance from the camera proper and is connected thereto by means of a long lead.

There are flash cameras on the market in which the shutter switch thereof serves to operate a solenoid instead of a battery. My device is operable in such type cameras also, a description and drawing of which has not been included herein for the reason that the operation of my device in such a camera is obvious to one skilled in the art.

I have had success with my testing device with the lamp 41 being a 2.0 volt and the cells 24 and 25 being 1½ volts each while the flashbulb 18 was of the conventional type requiring a voltage of approximately 3.0 volts to ignite same.

It is believed that this invention, its mode of construction and operation and many of its advantages should be readily understood from the foregoing without further description, and it should be manifest that while a preferred embodiment has been shown and described for illustrative purposes, the structural details are nevertheless capable of wide variation within the purview of this invention as defined in the appended claims.

What is claimed and desired to secure by Letters Patent of the United States is:

1. In a device of the character described which comprises a camera having a series flash bulb operating circuit associated therewith including a battery, a socket, adapted to have a flash bulb therein, and a shutter-actuated switch, means enabling independent testing of the operation of the switch, the operability of a flash bulb, and the strength of the battery comprising an electrically operated indicating device of relatively high resistance compared to the resistance of the flash bulb, connected across the switch and substantially one half of the battery and thereby forming two testing circuits, one having half the battery and the switch in series with the indicating device, and the other having the other half of the battery and the socket in series with the said indicating device, said device comprising a low voltage lamp which will light either when the socket is empty and the switch is closed, or if the switch is open and a lamp is inserted into operative engagement with the socket, the latter condition resulting in a flow of current through the flash bulb insufficient to ignite the same.

2. In a device of the character described which comprises a camera having a flash bulb circuit associated therewith consisting of a pair of dry cells, a shutter operated switch, and a flash bulb socket adapted to have a flash bulb inserted therein, all of said cells, socket and switch being connected in series, a common indicating device for testing the continuity of the various parts of the circuit which comprises a low voltage lamp connected to form two parallel circuits, one consisting of said lamp, said switch and one cell in series, and the second consisting of said lamp, said flash bulb socket and the second cell in series, said lamp having a relatively high resistance compared to the resistance of the flash bulb, whereby the lamp will light when the socket is empty and the switch is closed, or if the switch is open and the lamp is operatively engaged in said socket, the latter condition resulting in a flow of current through the flash bulb insufficient to ignite the same.

3. In a camera having a flash bulb circuit associated therewith comprising a pair of dry cells, a shutter operated switch, and a socket for securing a flash bulb therein, said cells being connected in series with each other and with the switch and socket, an electrical device for testing said circuit comprising indicating means connected to form two parallel branches in said circuit, each branch having one of said cells in series with the said indicating means whereby the said means is operative either when the socket is empty and the switch is closed or the switch is open and flash bulb is secured in the socket, the latter condition resulting in a flow of current through the flash bulb insufficient to ignite the same, said indicating means comprising a low voltage lamp of relatively high resistance compared with the resistance of the flash bulb.

JOHN KIRWIN.

REFERENCES CITED

The following references are of record in the file of this patent:

UNITED STATES PATENTS

| Number | Name | Date |
|---|---|---|
| 2,455,365 | Jenner | Dec. 7, 1948 |
| 2,467,591 | Lidfeldt et al. | Apr. 19, 1949 |

FOREIGN PATENTS

| Number | Country | Date |
|---|---|---|
| 370,142 | Great Britain | Apr. 7, 1932 |
| 395,040 | Great Britain | July 13, 1933 |